United States Patent [19]

Heron

[11] Patent Number: 6,094,461
[45] Date of Patent: Jul. 25, 2000

[54] DATA TRANSMISSION

[75] Inventor: Andrew Peter Heron, Suffolk, United Kingdom

[73] Assignee: British Telecommunications public limited company, London, United Kingdom

[21] Appl. No.: 08/711,851

[22] Filed: Sep. 10, 1996

[30] Foreign Application Priority Data

Jun. 25, 1996 [GB] United Kingdom ............... 9613228

[51] Int. Cl.⁷ .................................................. H04L 25/06
[52] U.S. Cl. ..................... 375/317; 370/292; 371/37.1; 371/37.9
[58] Field of Search ........................... 375/286, 287, 375/231, 317, 264, 295, 320, 219; 371/37.9, 37.1, 37.8, 30, 34; 370/292

[56] References Cited

U.S. PATENT DOCUMENTS

| | | | |
|---|---|---|---|
| 4,847,840 | 7/1989 | Jinguji . | |
| 4,928,288 | 5/1990 | D'Aria et al. ........................ | 375/287 |
| 5,166,956 | 11/1992 | Baltus et al. ....................... | 375/286 |
| 5,287,540 | 2/1994 | Kuusinen .......................... | 375/335 |
| 5,345,472 | 9/1994 | Lee .................................. | 375/200 |
| 5,461,379 | 10/1995 | Weinman, Jr. ...................... | 375/286 |
| 5,521,941 | 5/1996 | Wiatrowsky et al. ................ | 375/287 |
| 5,534,938 | 7/1996 | Citta et al. ......................... | 348/495 |
| 5,630,014 | 5/1997 | Yoshida et al. ..................... | 395/2.34 |
| 5,684,833 | 11/1997 | Watanabe ........................... | 375/286 |
| 5,692,010 | 11/1997 | Nielsen ............................. | 375/232 |
| 5,841,484 | 11/1998 | Hulyalkar et al. .................. | 348/607 |

FOREIGN PATENT DOCUMENTS

| | | |
|---|---|---|
| 2505114 | 11/1982 | France . |
| WO 93/10624 | 5/1993 | WIPO . |

*Primary Examiner*—Fan Tsang
*Assistant Examiner*—Congvan Tran
*Attorney, Agent, or Firm*—Nixon & Vanderhye P.C.

[57] ABSTRACT

A transmitter (20) having means (206, 207) to encode an input signal to form coded data, each element of said coded data having one of at least two discrete signal magnitude levels, the encoding means including in the coded data a periodic training sequence of data (T); and a receiver (30) to receive the coded data and, on the basis of the received training sequence, to adapt a threshold or thresholds to allow the discrete levels to be distinguishable from each other. The training sequence T may comprise a plurality of elements at least one of which, in turn, represents each one of the discrete signal levels. The receiver generates a look-up-table to store the adapted thresholds.

18 Claims, 6 Drawing Sheets

| Line No. | Known Transmitted Value of | | | | Example of Approximate Digital Received Value of $T_3$ |
|---|---|---|---|---|---|
| | $T_1$ | $T_2$ | $T_3$ | $T_4$ | |
| 1 | 0 | 0 | 0 | 0 | 64 |
| 2 | 0 | 0 | 1 | 0 | 86 |
| 3 | 0 | 0 | 2 | 0 | 108 |
| 4 | 0 | 0 | 3 | 0 | 130 |
| 5 | 0 | 0 | 4 | 0 | 152 |
| 6 | 0 | 0 | 5 | 0 | 174 |
| 7 | 0 | 0 | 6 | 0 | 196 |
| 8 | 0 | 0 | 7 | 0 | 218 |
| 9 | 0 | 1 | 0 | 0 | 66 |
| 10 | 0 | 1 | 1 | 0 | 88 |
| 11 | 0 | 1 | 2 | 0 | 110 |

Fig.5

| Succeeding Symbol n+1 | Preceding Symbol n-2 | Preceding Symbol n-1 | Decision Thresholds | |
|---|---|---|---|---|
| 0 | 0 | 0 | thr 1 | 75 |
| 0 | 0 | 0 | thr 2 | 97 |
| 0 | 0 | 0 | thr 3 | 119 |
| 0 | 0 | 0 | thr 4 | 141 |
| . | . | . | thr 5 | 163 |
| . | . | . | thr 6 | 185 |
| . | . | . | thr 7 | 207 |
| 0 | 0 | 1 | thr 1' | 77 |
| . | . | . | thr 2' | 99 |
| . | . | . | thr 3' | . |
| . | . | . | . | . |

Fig.6

| Level of | | | Current symbol level 's' | Level of current symbol n (LUT output) |
|---|---|---|---|---|
| succeeding symbol n+1 | preceeding symbol n-2 | preceeding symbol n-1 | | |
| 0 | 0 | 0 | s ≤ thr 1 | 0 |
| | | | thr 1 < s ≤ thr 2 | 1 |
| | | | thr 2 < s ≤ thr 3 | 2 |
| | | | thr 3 < s ≤ thr 4 | 3 |
| | | | thr 4 < s ≤ thr 5 | 4 |
| | | | thr 5 < s ≤ thr 6 | 5 |
| | | | thr 6 < s ≤ thr 7 | 6 |
| | | | s > thr 7 | 7 |
| 0 | 0 | 1 | s > thr 1' | 0 |

Fig.7

DATA TRANSMISSION

BACKGROUND OF THE INVENTION

1. Field of the Invention

This invention relates to data transmission and in particular to data transmission in which a multi-level representation of a digital signal is transmitted.

2. Related Art

Digital data represents a signal that has been quantized in both time and amplitude. The digital data thus approximates the actual value of an analogue signal. If an analogue signal is digitized, the range of the analogue signal is divided into a number of levels e.g. 16, the analogue signal is sampled at set intervals and the appropriate level at that instant is determined. Since only 16 levels are used, the level which is closest to the actual level is chosen. A signal that is reconstructed from this digital data resembles but is not exactly the same as the original analogue signal.

In binary digital data, a signal is represented by 0 or 1, a 0 being a 0 V pulse and a 1 being a 5 V pulse for example. If a sample of an input signal has an amplitude greater than half of the maximum range, the signal sample is represented by a 1. A 0 will result from samples having an amplitude less than half. Thus a series of ones and zeros is produced.

To reproduce the original signal, a receiver needs to know the threshold between the two levels. This is usually done by the transmitter signalling to the receiver the maximum range of the signal, the number of levels and the spacing of the levels e.g. if they are linearly spaced etc. The receiver then determines the threshold(s) and decodes an incoming signal. In practice, in a multi-level system there are distortions in the signal due to the response of the network, namely overshoot and ringing. The instantaneous level of any received sample is not only dependent on the transmitted sample, but on the recent previously transmitted samples and possibly the subsequently transmitted sample or samples.

SUMMARY OF THE INVENTION

According to the present invention, there is provided a data transmission system comprising:

a transmitter having means to encode an input signal to form coded data, each element of said coded data having one of at least two discrete signal magnitude levels, the encoding means including in the coded data a periodic training sequence of data; and a receiver to receive the coded data and, on the basis of the received training sequence, to adapt a threshold or thresholds to allow the discrete levels to be distinguishable from each other.

Such a system allows the receiver continually to adapt the threshold(s) in dependence on the dynamic conditions of the transmission link between the transmitter and receiver.

Preferably the training sequence comprises at least two elements, the receiver including means to monitor the effect of at least one of the elements of the training sequence on another of said elements of the training sequence and adapt the threshold(s) accordingly.

Thus the effects of the transmission link on groups of elements is accounted for.

The invention also relates to the transmitter and a receiver.

BRIEF DESCRIPTION OF THE DRAWING

The invention will now be described by way of example only with reference to the accompanying drawings in which.

DETAILED DESCRIPTION OF EXEMPLARY EMBODIMENTS

Figure 1:
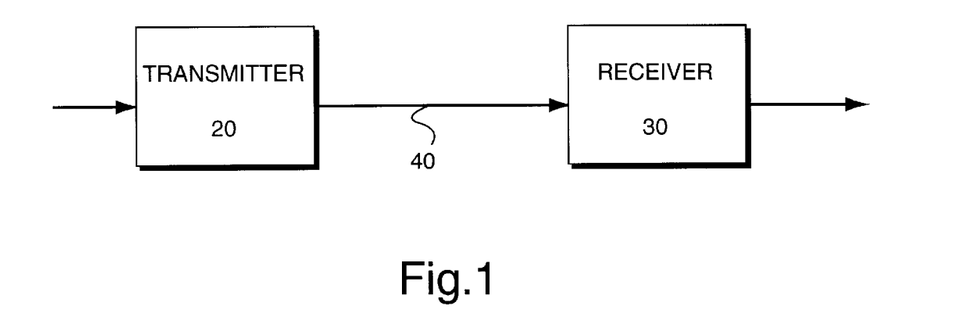
FIG. 1 shows a data transmission system according to the invention.

As shown in FIG. 1 the digital data transmission system comprises a transmitter 20, a receiver 30 and a communications link 40. Data is transmitted from the transmitter 20 to the receiver 30 via the communications link 40 which may take any suitable form. For example the communications link 40 may be part of a Public Switched Telephone Network (PSTN), a dedicated line such as provided by an Integrated Services Digital Network (ISDN), a radio link, coaxial cable, optical fibre etc.

For illustrative purposes, the data transmission system to be described refers to the transmission of data representing a video image. However the invention is applicable to any system that transmits multi-level digital data, in particular for transmission over an analogue transmission link e.g. cable modems, higher bit rate teletext services.

The data transmission system to be described is suitable for distributing digital television signals to customers over an analogue hybrid fibre-coax network. In order to use existing analogue network infrastructure, the digital signals must be capable of being transmitted over the existing network in the same way as an ordinary TV channel.

The digital signal must therefore occupy a similar bandwidth to the ordinary TV channel (6–7 MHz). It must also 'look' like a TV signal in terms of amplitude and have regular 'line' sync pulses at (in the U.K.) 15.625 kHz, as some dc restoration in the network relies on this. Signal to noise ratio is around 50 dB and there are non-linearities such as differential gain errors and sync pulse clipping to overcome.

In order to obtain reasonable capacity improvements over analogue, sufficient digital capacity to carry four multiplexed MPEG video streams of acceptable quality were desired.

The invention uses multi-level coding, whereby serial digital data is split into symbols of n bits. Each symbol is then coded as one of $2^n$ discrete levels within the active video region.

By choosing the symbol rate to be 6.75 MHz the minimum pulse width encountered is $1/6.75 \times 10^6$ i.e. 148 ns. This should pass through the bandwidth of the system without too much degradation. Given the system signal to noise ratio, it would be reasonable to expect to be able to recover eight distinct levels, giving three bits per symbol (i.e. n=3).

Experiments have shown that it is not really necessary to maintain any frame timing as all clamps and dc restorers in the system use only the line syncs, and black levels. This means the frame timing can be omitted and a continuous stream of active 'lines' used. This increases the data throughput and simplifies the transmitter and receiver design.

By choosing a master clock rate of 27 MHz, readily available TV sampling clock recovery chips can be used to provide a reasonably low jitter line locked clock at the receiver. The signal can be oversampled at this rate to determine the best sampling position. Readily available video analogue-to-digital converters (ADCs) can be used as well as reasonable speed logic.

Figure 2:
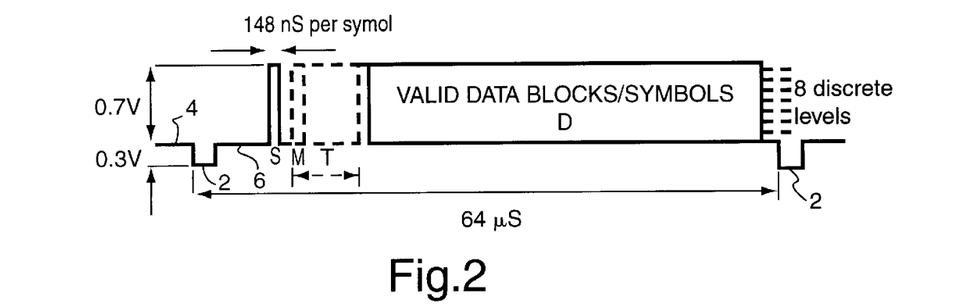
FIG. 2 shows an example of the line format of coded video data transmitted by the data transmission system of FIG. 1.

A diagram of the waveform to be transmitted is shown in FIG. 2. It consists of a synchronization (sync.) pulse 2 having a standard width and amplitude, repeating at 15.625 kHz. This is preceded and succeeded respectively by a front porch 4 and a back porch 6 to allow readily available TV sync pulse separators and analogue to digital converters to be used.

After the back porch 6 is a start pulse (S) which is used by the receiver to determine the best sampling position. There then follow eight symbols, five of which form a training sequence (T) which step through a set sequence over a number of lines. The first of these symbols (M) is a marker to allow the start of the training sequence to be determined. The exact nature and function of the training sequence will be described later.

There then follow a number of valid data symbols D. Each is nominally 148 ns wide and is represented by one of eight distinct levels, nominally 0.1V apart. The valid data can be split up into blocks to allow the addition of a block based forward error corrector (FEC). One overhead in systems which use block based FEC is the need to add framing bits to define the block boundaries, and the hardware at the receiver to search for and lock onto the framing. This is not necessary in this scheme as the data is already divided into 'lines' which can be further subdivided into blocks.

The choice of error corrector block size and total number of symbols per line depends on the required bit rate and the correcting power of the FEC.

The proposed system uses a BCH (Bose-Chaudhuri Hocquenghem) forward error corrector and divides the line into 17 blocks of 63 bits. Each 63 bit block contains 21 3-bit symbols, consisting of 19 symbols of data (57 bits) and 2 symbols of check bits (6 bits), giving a payload bitrate of 57×17×15625=15.140625 Mbit/sec.

For the sake of having a 'round' bitrate, the last block has three symbols which are not filled with data, giving ((57×17)−9)×15625=15.00 MHz. It is felt that this is a reasonable rate into which four MPEG encoded TV channels can be multiplexed, giving the required quality per channel.

The FEC is capable of correcting one bit in error in each block. In order to reduce the likelihood of multiple-bit errors the symbols are Gray coded so that adjacent levels represent bit patterns with only one bit difference.

Figure 3:
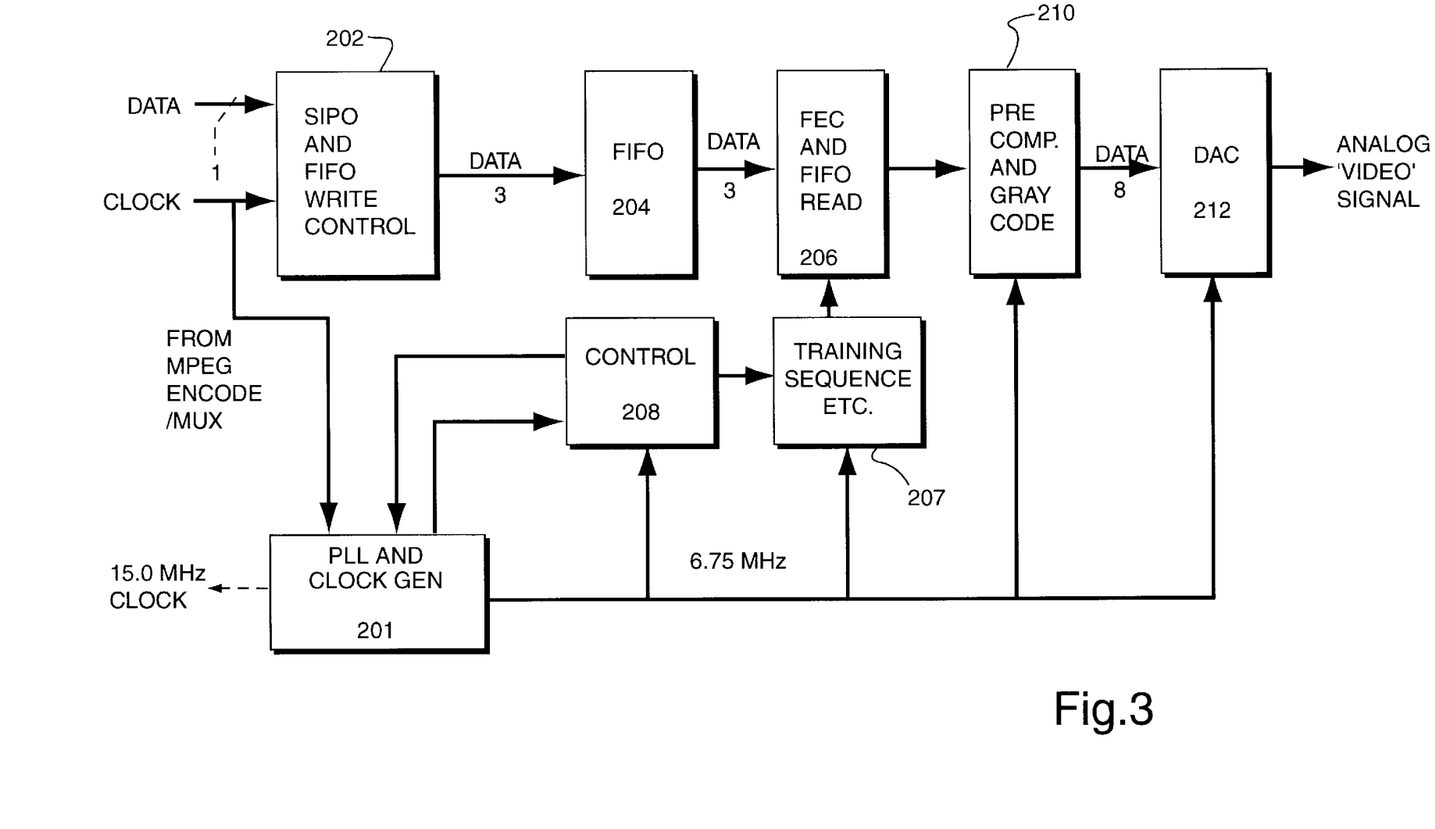
FIG. 3 shows a transmitter according to the invention.

An example of the transmitter 20 is shown in FIG. 3. The transmitter 20 can either be a slave to the MPEG multiplexer clock, or a master clock provider. The phase locked loop (PLL) and clock generator 201 generates the 6.75 MHz symbol clock locked to the 15 MHz data bit clock.

The incoming binary digital data is split into 3-bit symbols by a serial-in-parallel-out (SIPO) shift register 202 and stored in a first in, first out (FIFO) buffer 204. The FIFO 204 buffers the symbols between the continuous input data rate and the 'bursty' line and block structure. The symbols are read from the FIFO 204 and BCH FEC check bits are added by FEC encoder 206. At the start of each line, the sync pulse, black level (i.e. front porch and back porch), start pulse (S) and training sequence are added by a unit 207 under control of a control block 208. The data is then Gray coded and converted to an 8-bit representation 210 before being presented to the digital-to-analogue converter DAC 212. A certain amount of pre-compensation can be added at this stage to help reduce overshoot in the network. This effectively reduces the rise-time of the edges within the signal. The analogue output of the DAC 212 can then be transmitted across the network in the same way as a normal TV channel. An analogue post filter can be added if necessary to band limit the signal to suit the network.

Figure 4:
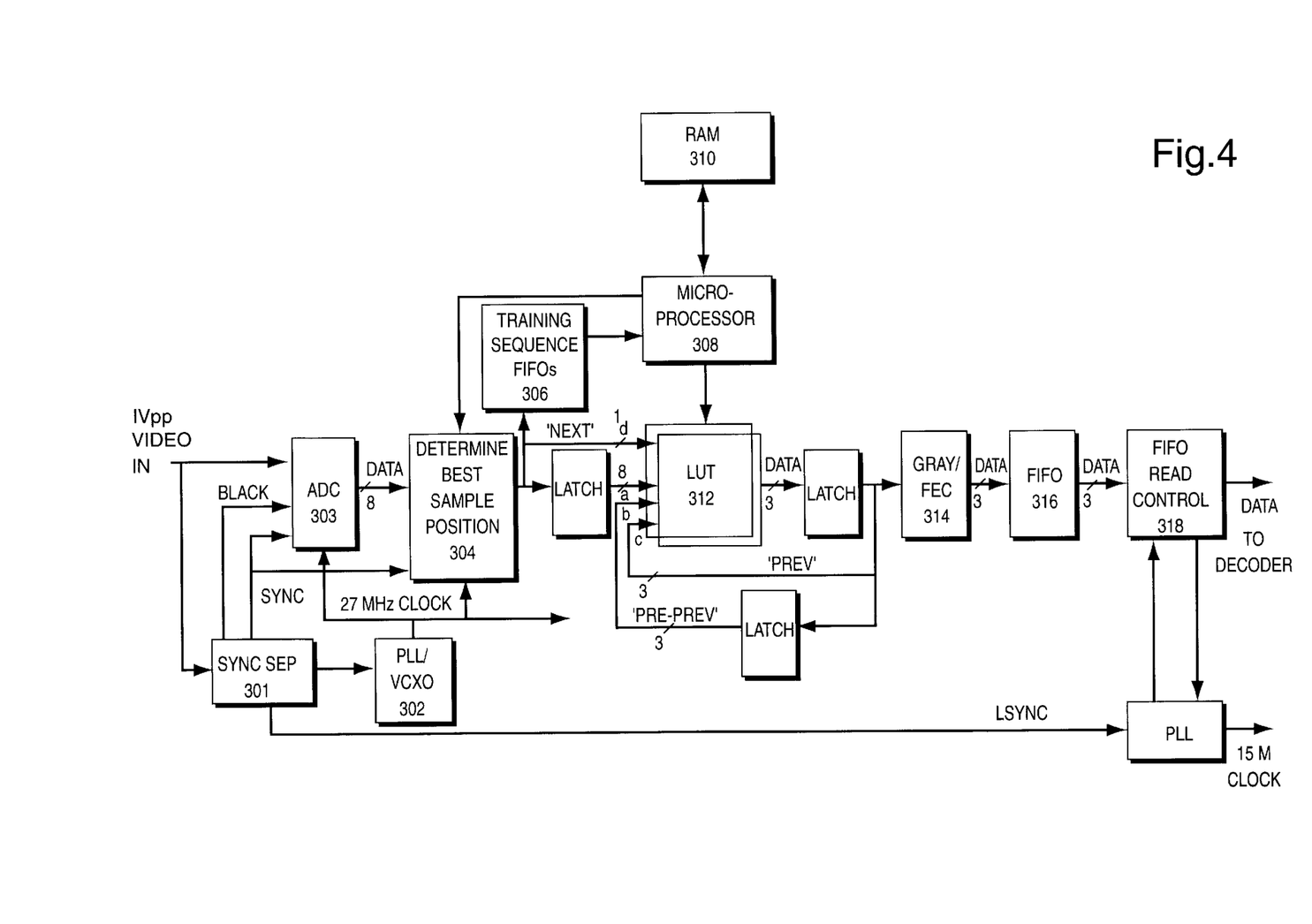
FIG. 4 shows a receiver according to the invention.

A block diagram of the receiver 30 is shown in FIG. 4. A sync. separator 301 extracts sync. and black level pulses from the incoming signal. A PLL and voltage-controlled crystal oscillator (VCXO) 302 generates a line locked 27 MHz clock.

An 8-bit ADC 303 digitizes the incoming signal into an 8 bit signal. The ADC 303 has an on-chip clamp and automatic gain control (AGC) which uses the sync. and black level pulses. The effect of the AGC is to set the digital output at the base of the sync. pulse 2 to 0 and the black level (i.e. the level of the front and back porch 4 and 6) to 63. A nominal maximum level video input of say 0.7V is then given a level of 213. As the AGC gain is calculated using the sync. pulse height, any clipping of the sync. pulse by the transmission network will alter this nominal maximum height. The ADC is clocked at 27 MHz.

Logic 304 which follows the ADC 303 contains a state machine which searches for the start pulses (S) after each line sync pulse 2. The start pulse S will be rounded after having passed through the network and the best sampling position is taken as the sample closest to its peak. An inverted version of the clock can be used if this gives a better sample position.

The training sequence will now be described. The training sequence is 1024 lines long and occupies five symbols at the start of each line between the start pulse S and the valid data symbols D. The first symbol (M) in the sequence indicates the start of the training sequence; it is high (level 7) on the first line of the sequence and low (level 0) on all the other lines. The next three symbols $T_1$, $T_2$, $T_3$, symbols count through a sequence of all the possible combinations of eight levels for the three symbols ($8^3$ combinations), line by line, with the last symbol $T_4$ low (level 0) or high (level 7) giving $2 \times 8^3$ i.e. 1024 combinations, occupying 1024 lines (approx. 65 mSec.)

Figure 5:
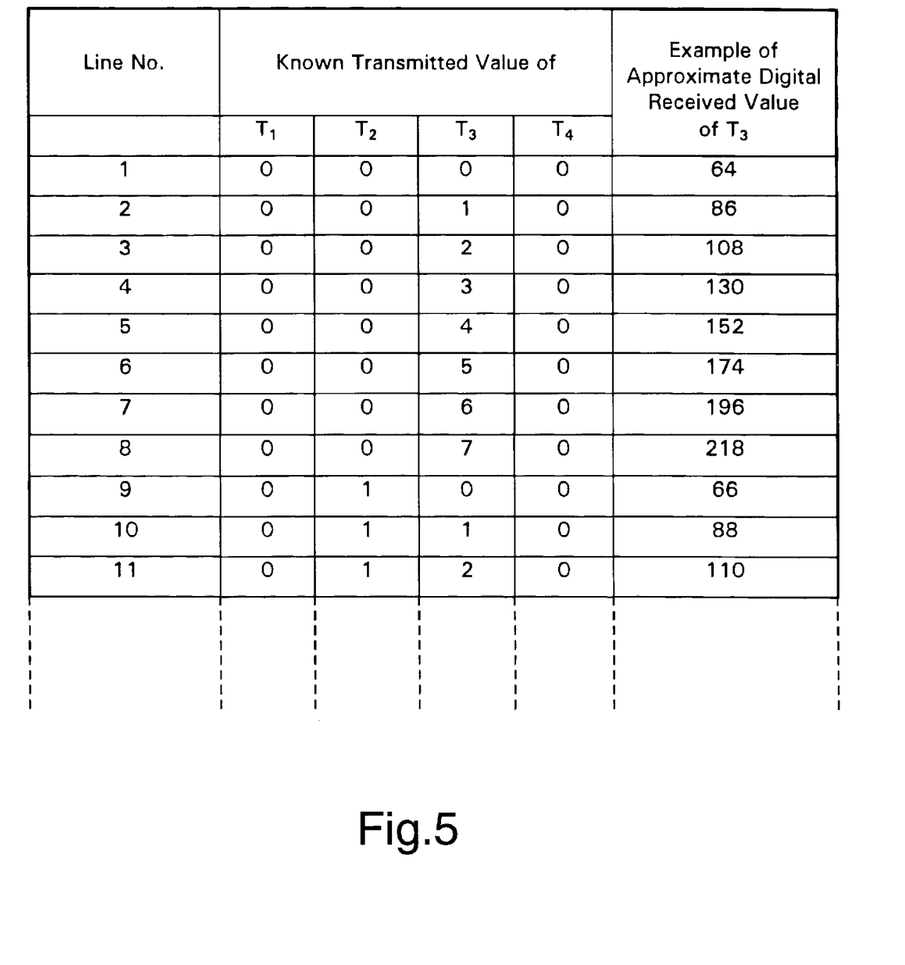
FIG. 5 shows an example of the contents of a buffer after eleven lines of the training sequence have been received.
Figure 6:
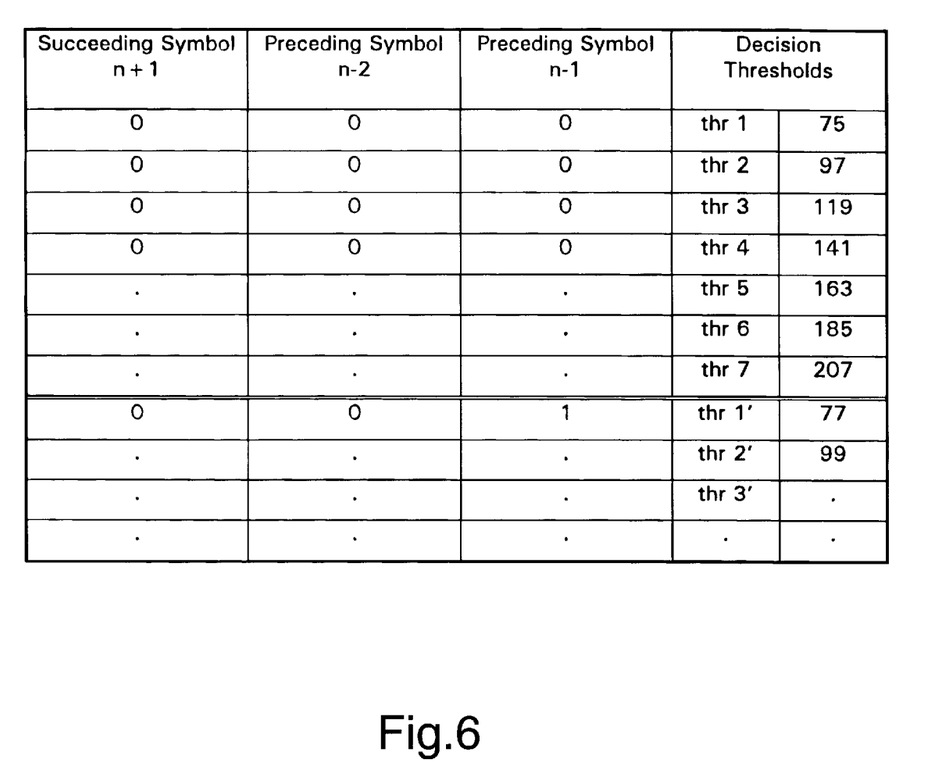
FIG. 6 shows an example of a set of thresholds, generated from the contents of the buffer as shown in FIG. 5.
Figure 7:
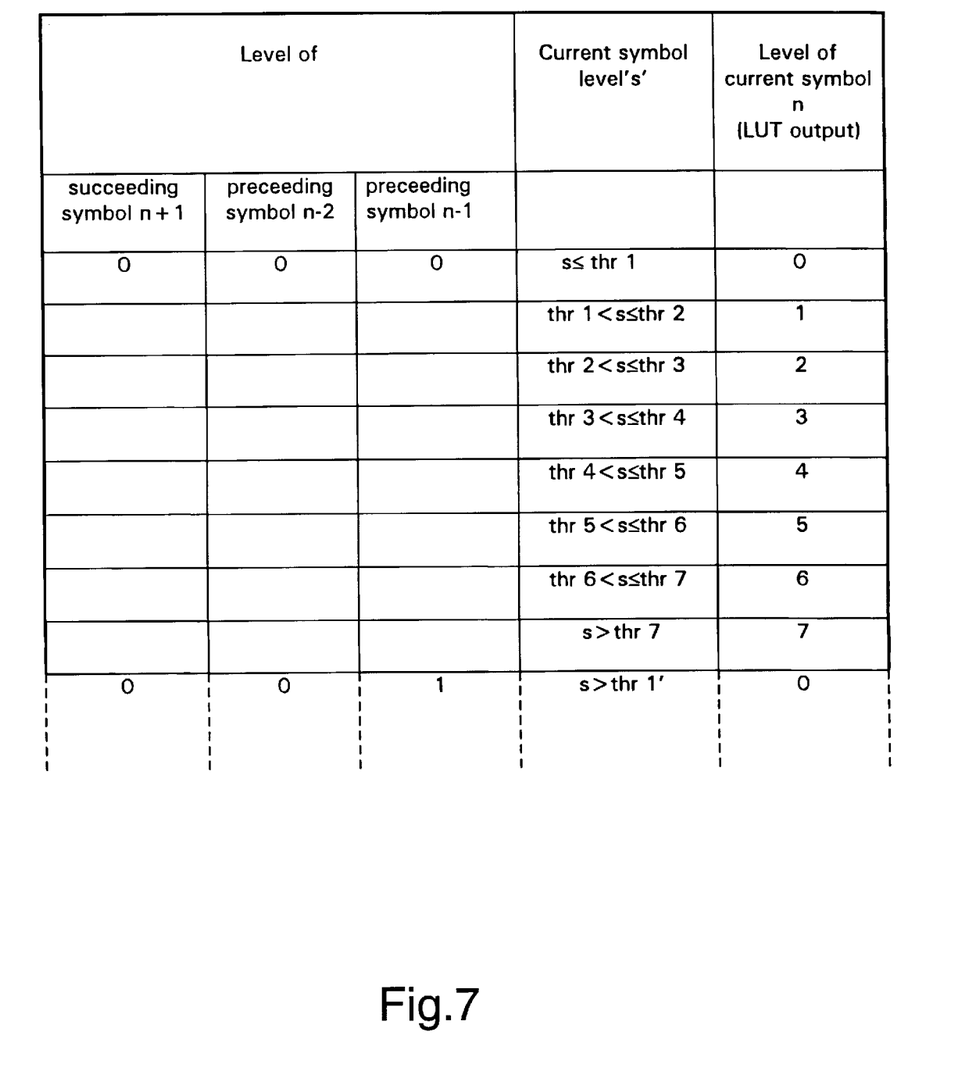
FIG. 7 shows an example of a look-up-table generated from the thresholds of FIG. 6.

At the receiver, the level of the fourth symbol $T_3$ in the training sequence of each line is sampled and stored in a FIFO 306. Thus after 1024 lines the FIFO 306 contains examples of all levels of the fourth symbol with all combinations of the two preceding symbols $T_1$, $T_2$ and the succeeding symbol $T_4$ being low or high. FIG. 5 shows an example of the contents of FIFO 306 after 11 lines of data. A microprocessor 308 calculates a set of seven decision thresholds for each of the combinations of preceding and succeeding levels and generates a look-up-table (LUT) which is stored in SRAM 312. For example, samples 1–8 in the FIFO 306 represent the levels of the fourth symbol of the training data, $T_3$, when both of the preceding symbols $T_1$ and $T_2$ and the succeeding symbol $T_4$ are at level 0. The microprocessor 308 thus calculates the seven decision thresholds to be applied when the preceding two symbols are zero and the succeeding symbol is zero. This is typically achieved by setting each threshold for $T_3$ halfway between the two received training levels i.e. threshold=$L_1+[(L_2-L_1)/2]$ where $L_1$ and $L_2$ are the received levels for successive $T_3$ symbols. FIG. 6 shows an example of the thresholds for this example case, as stored in the microprocessor's RAM, 310. The microprocessor then uses this set of thresholds to calculate a LUT, as shown in FIG. 7, and stores it in SRAM, 312.

The LUT is then used to perform thresholding of the valid data D in real time. The 8-bit decoded data is applied to the LUT 312, via input a. The previous two samples of the input data are input to inputs b and c respectively. The level of the subsequent sample of the input data is input via input d. This input d is a simple high/low indication derived from the sample before the one presented to input a of the comparator 312. For valid data, the succeeding sample may have any value between the maximum and the minimum (213 and 0 respectively in this embodiment). A notional threshold is set midway between the maximum and the minimum. If the value of the subsequent sample is above this threshold, the value of the subsequent sample is considered to be high; if the value is below, it is considered to be low. Inputs b and c can be taken as latched outputs from the LUT 312 as then they have been quantized and are only three bits each, reducing the required LUT size.

In practice the LUT comprises two banks of SRAM. Once the microprocessor has calculated a LUT and written it to the SRAM, it 'pages' that LUT into the real-time data path. It then performs the whole cycle again, capturing a new FIFO full of training data and recalculating a set of thresholds. These can be averaged with the previous set to reduce the effects of random noise and a new LUT calculated. This is then paged-in in place of the previous LUT. The process repeats like this as fast as the processor can perform the tasks. Thus the system adapts to the response of the communications link 40 and tracks any long term changes in the response.

As a further enhancement, the microprocessor can use the samples stored in the FIFO 306 to measure the pulse response of the link. The pulse response may indicate that the level of any sample is more dependent on the subsequent sample rather than the sample two-previously, which may happen if the bandwidth of the communications link is low. The training sequence can then be sampled at its third symbol rather than its fourth and the input to the LUTs can be changed to input more bits of the subsequent sample rather than the two-previous sample. The processor would then have samples of all the combinations of previous and subsequent samples and could generate LUTs in a similar way.

The thresholded 3-bit symbols are then inverse Gray coded and passed through the BCH FEC detector/corrector 314 which corrects any single bit errors in each 64 bit block. The data then passes through a rate conversion FIFO 316 and is re-clocked out by control 318 at a continuous 15.0 MHz. This is passed to an MPEG demultiplexer/decoder for decoding in a conventional manner.

What is claimed is:

1. A data transmission system comprising:

a transmitter having means to encode an input signal to form coded data, each element of said coded data having one of at least two discrete signal magnitude levels, the encoding means including in the coded data a periodic training sequence of data;

a receiver to receive the coded data and, on the basis of the received training sequence, to adapt a threshold or thresholds to allow the discrete levels to be distinguished from each other;

the training sequence including at least two elements, and the receiver including means to monitor the effect of at least one of the elements of the training sequence on another of said elements of the training sequence and adapt the threshold(s) accordingly.

2. A data transmission system comprising:

a transmitter having means to encode an input signal to form coded data, each element of said coded data having one of at least two discrete signal magnitude levels, the encoding means including in the coded data a periodic training sequence of data;

a receiver to receive the coded data and, on the basis of the received training sequence, to adapt a threshold or thresholds to allow the discrete levels to be distinguished from each other; and means to generate a look-up-table according to the levels of the elements of the received training sequence and the associated adapted threshold(s).

3. A data receiver comprising:

an input for receiving input data, each element of said input data representing one of at least two discrete signal magnitude levels, said input data including a known training sequence, means to adapt a threshold or thresholds to allow the discrete levels to be distinguishable one from another;

the training sequence including at least two elements, and the adaptive threshold means including means to monitor the effect of at least one of the elements of the training sequence on another of said elements of the training sequence and adapt the threshold(s) accordingly.

4. A data receiver comprising:

an input for receiving input data, each element of said input data representing one of at least two discrete signal magnitude levels, said input data including a known training sequence, means to adapt a threshold or thresholds to allow the discrete levels to be distinguishable one from another; and means to generate a look-up-table according to the levels of the elements of the received training sequence and the associated adapted threshold(s).

5. A data transmitter having means to encode an input signal to form coded data, each element of said coded data having one of at least two discrete signal magnitude levels, the encoding means including means to generate a predetermined training sequence of data having elements assuming said discrete levels, said transmitter being arranged to transmit a plurality of said training sequences each of which comprises a plurality of elements, each assuming one of said discrete levels, successive ones of said sequences cycling through different combinations of said discrete levels.

6. A data transmitter having:

means to encode an input signal to form coded data, each element of said coded data having one of at least two discrete signal magnitude levels, the encoding means including in the coded data a periodic training sequence of data;

at least one element of the periodic training sequence representing, in turn, each of the discrete signal magnitude levels; and the periodic training sequence including at least two elements each of which, in turn, represent each one of the discrete signal magnitude levels.

7. A data transmission system comprising:

a transmitter having means to encode an input signal to form coded data, each element of said coded data having one of at least two discrete signal magnitude levels, the encoding means including means to generate a predetermined training sequence of data having elements assuming said discrete levels; and a receiver having decoding means to receive said coded data and to compare the received coded data with a threshold or thresholds to allow the discrete levels to be distinguishable from each other, said receiver further having threshold means operable on the basis of the received training sequence to adapt said threshold(s);

wherein the training sequence comprises at least two elements, and the threshold adaptation means includes means to monitor the effect of at least one of the elements of the training sequence on another of said elements of the training sequence and adapt the threshold(s) accordingly.

8. A data transmission system as in claim 7 in which the transmitter is arranged to transmit a plurality of said training sequences each of which comprises a plurality of elements, each assuming one of said discrete levels, successive ones of said sequences cycling through different combinations of said discrete levels.

9. A data transmission system as in claim 8 in which the transmitter forms a signal having a periodic structure, with each period thereof containing a said training sequence, a plurality of elements of said coded data, and a synchronization pulse having an amplitude lying outside the range of said discrete levels.

10. A data transmission system comprising:

a transmitter having means to encode an input signal to form coded data, each element of said coded data having one of at least two discrete signal magnitude levels, the encoding means including means to generate a predetermined training sequence of data having elements assuming said discrete levels; and a receiver having decoding means to receive said coded data and to compare the received coded data with a threshold or thresholds to allow the discrete levels to be distinguishable from each other, said receiver further having threshold means operable on the basis of the received training sequence to adapt said threshold(s);

wherein the threshold adaptation means serves upon receipt of said training sequence to calculate thresholds therefrom and to store said calculated thresholds, and the decoding means is connected to receive, via delay means, a feedback signal of at least one previously decoded element and to choose different ones of said calculated thresholds in dependence upon said feedback signal.

11. A data transmission system as in claim 10 in which the decoding means is also connected to receive a feedforward signal, being an estimate of an as yet undecoded element, upon which said choice of threshold also depends.

12. A data transmission system as in claim 11 wherein the decoding means is in the form of a look-up table generated according to said calculated threshold(s).

13. A data receiver comprising:

an input for receiving an input signal including coded data, each element of said coded data representing one of at least two discrete signal magnitude levels, said input signal further including a known training sequence, and decoding means to compare with coded data with a threshold or thresholds to allow the discrete levels to be distinguishable one from another said receiver further having a store containing information describing said predetermined sequence and threshold adaptation means operable on the basis of the received training sequence and said sequence describing information to adapt said threshold(s);

wherein the training sequence comprises at least two elements, the threshold adaptation means including means to monitor the effect of at least one of the elements of the training sequence on another of said elements of the training sequence and adapt the threshold(s) accordingly.

14. A data receiver comprising:

an input for receiving an input signal including coded data, each element of said coded data representing one of at least two discrete signal magnitude levels, said input signal further including a known training sequence, and decoding means to compare with coded data with a threshold or thresholds to allow the discrete levels to be distinguishable one from another said receiver further having a store containing information describing said predetermined sequence and threshold adaptation means operable on the basis of the received training sequence and said sequence describing information to adapt said threshold(s);

wherein the threshold adaptation means serves upon receipt of said training sequence to calculate thresholds therefrom and to store said calculated thresholds, and the decoding means is connected to receive, via delay means, a feedback signal of at least one previously decoded element and to choose different ones of said calculated thresholds in dependence upon said feedback signal.

15. A data transmission system as in claim 14 in which the decoding means is also connected to receive a feedforward signal, being an estimate of an as yet undecoded element, upon which said choice of threshold also depends.

16. A data receiver as in claim 11 wherein the decoding means is in the form of a look-up table generated according to said calculated threshold(s).

17. A data transmitter having means to encode an input signal to form coded data, each element of said coded data having one of at least two discrete signal magnitude levels, the encoding means including means to generate a predetermined training sequence of data having elements assuming said discrete levels, said transmitter being arranged to transmit a plurality of said training sequences each of which comprises a plurality of elements, each assuming one of said discrete levels, successive ones of said sequences cycling through different combinations of said discrete levels;

wherein the transmitter forms a signal having a periodic structure, with each period thereof containing a said training sequence, a plurality of elements of said coded data, and a synchronization pulse having an amplitude lying outside the range of said discrete levels.

18. A method for adaptively establishing multiple digital signal detection levels for use in decoding received signals conveying a symbol value as one of multiple digitized levels, said method comprising:

generating a predetermined sequence of digital multi-level training signals each signal being a predetermined one of multiple digitized signal levels;

transmitting said predetermined sequence over an intended communication path to a multi-level signal receiver; and using a thus received predetermined sequence of multiple digitized signal levels to monitor the effects of at least one portion of the training sequence on another portion of the training sequence and to responsively adapt and establish multiple threshold levels for use in decoding multi-level digital data signals sent over said communication path.

* * * * *